UNITED STATES PATENT OFFICE.

EMILE LOUIS PAUL COËZ AND GUSTAVE CLÉMENT COËZ, OF ST. DENIS, FRANCE.

PROCESS OF MAKING TANNING EXTRACTS.

SPECIFICATION forming part of Letters Patent No. 302,105, dated July 15, 1884.

Application filed July 25, 1883. (No specimens.) Patented in France June 4, 1883, No, 155,842; in Belgium June 22, 1883, No. 61,786; in England June 26, 1883, No. 3,150; in Italy July 5, 1883, No. 15,671; in Spain November 7, 1883, No. 4,784, and in Austria November 19, 1883, No. 24,427.

*To all whom it may concern:*

Be it known that we, EMILE LOUIS PAUL COËZ and GUSTAVE CLÉMENT COËZ, both citizens of the Republic of France, and residing in St. Denis, France, have invented certain Improvements in the Preparation of Tannic Extracts, of which the following is a specification.

The tannic extracts heretofore supplied by the trade to tanners are to a certain extent rendered colorless by various processes; but the great defect of these extracts is that they are imperfectly freed from the coloring-matter which they contain, this matter being in fact merely neutralized by chemical agents and liable to reappear at any time under certain conditions—such as age or exposure to the air, for example. In consequence of this defect the tanner is unable to place any reliance on the results obtained with these products. According to our invention the tannic juices are deprived of color by removing the coloring-matter, instead of simply neutralizing it, as in the processes usually employed. This result is obtained as hereinafter described. The tanning matter or juices being extracted or obtained by the usual processes, the decoctions are placed in wooden vessels, in which they are immediately subjected to the process of decolorization in the following manner, namely: Oxalic acid is first added in the proportion of one gram of acid to every hundred liters of juice, (the density of the latter is of little moment,) for the purpose of saturating the lime which is contained in the water used in the process of extraction in proportions varying according to the quality of the said water. After allowing a few minutes for the oxalic gas to act, alumina is introduced in the proportion of about two hundred and fifty grams of alumina per hundred liters of juice and per degree of density. For this purpose we prefer to employ alumina in the condition of a jelly. The materials are now violently agitated, and the mixture being filtered immediately thereafter, the alumina remains upon the filter, together with the coloring-matter. The clear tannic juice from which the coloring-matter has thus been removed is collected and evaporated *in vacuo* by known means and brought to a density of about 20° Baumé.

The tannic extract obtained by means of this process is remarkably pure, fluid, soluble, and readily assimilated by hides or skins.

In order to produce tannic acid by this process, the proportion of alumina hereinbefore indicated must be quadrupled. This increase in the quantity of alumina has the effect of causing the colorless extracting and mucilaginous matter to be absorbed, (which matter may be allowed to remain without disadvantage in the extract used in tanning.) A solution of tannic acid is thus obtained, which is also evaporated to a density of about 20° Baumé.

This process is applicable to all vegetable matter containing tannin, such as wood, bark, leaves, husks, and the like.

We claim—

1. The mode herein described of preparing tannic extracts, said mode consisting in first subjecting the extracts to the action of oxalic acid, then mixing alumina therewith, and finally separating the alumina from the juice, substantially as set forth.

2. The mode herein described of treating tannic extracts to obtain tannic acid, said mode consisting in first subjecting the extracts to the action of oxalic acid, then mixing alumina therewith in about the proportion herein set forth, and finally separating the alumina from the juice, substantially as described.

In testimony whereof we have signed our names to this specification in the presence of two subscribing witnesses.

EMILE LOUIS PAUL COËZ.
   GUSTAVE CLÉMENT COËZ.

Witnesses:
 JOSEPH DELAGE,
 EDWARD P. MACLEAN.